ERROR CLASSIFICATION AND CORRECTION SYSTEM

Filed Nov. 27, 1962 6 Sheets-Sheet 1

INSTRUCTION WORD

DATA WORD

INVENTOR
HOWARD C. MONTGOMERY

BY Gunter A. Hauptman

ATTORNEY

TIMING

ERROR CLASSIFICATION AND CORRECTION SYSTEM

Filed Nov. 27, 1962

6 Sheets-Sheet 3

April 26, 1966 H. C. MONTGOMERY 3,248,697

ERROR CLASSIFICATION AND CORRECTION SYSTEM

Filed Nov. 27, 1962 6 Sheets-Sheet 6

REPETITION CONTROL 19

TABLE

| STORES (TRIGGERS) | | ERROR COUNTER | OUTPUT IF ERROR |
|---|---|---|---|
| DNR | IC+1 | | |
| 0 | X | ≠ 3 | C1 (UNKNOWN ERROR) |
| 1 | 0 | ≠ 3 | RESET CC, IC-1 |
| 1 | 1 | ≠ 3 | RESET CC |
| X | X | = 3 | C2 (SOLID ERROR) |

X = NOT USED

United States Patent Office 3,248,697
Patented Apr. 26, 1966

3,248,697

ERROR CLASSIFICATION AND CORRECTION SYSTEM

Howard C. Montgomery, Poughkeepsie, N.Y., assignor to International Business Machines Corporation, New York, N.Y., a corporation of New York Filed Nov. 27, 1962, Ser. No. 240,227
12 Claims. (Cl. 340—146.1)

This invention relates to electronic apparatus, more particularly this invention relates to circuits for classifying malfunctions in electronic apparatus and for taking corrective action in accordance with the classification.

The invention will be described with reference to apparatus embodied in an electronic digital computer controlled by a program of instructions. However, the invention may be used in many other types of electronic apparatus such as: message switching exchanges, input/output controllers, electronic editing devices, and, for that matter, any electronic apparatus which may be subject to several types of malfunctions and which is large enough to warrent the use of a circuit for classifying and correcting the malfunctions.

Electronic digital computers operate upon data in accordance with instructions arranged into a number of programs. Both the data and the instructions are represented by electric signal pulses each signal being assigned, depending upon its value, either the binary quantity zero (0-bit) or the binary quantity one (1-bit). A plurality of these binary "bits" are arranged to represent a data "word" or an instruction "word." Data words are processed in the system in accordance with the instruction words; instruction words being executed one at a time in sequence as taken from a program. As will be explained, there may be several programs in a data processing system, instructions being taken from any selected ones of the programs.

During the execution of an instruction, which is usually performed as a series of time-spaced steps, it is possible that there may be a malfunction in the system. Malfunctions, or "errors," can be either short-lived ("transient") or long-lived ("solid"). A transient error may, for example, be the result of a sudden fluctuation in the power supply or from a mechanical shock. Failure of a component, such as a vacuum tube or a transistor, may result in a solid error.

In the prior art, the occurrence of an error was usually handled without regard to the classification of the error as transient or solid. In one well-known prior art scheme, the detection of any error would completely stop the system. This resulted in an expensive non-usage of the system until corrective action could be taken by an operator, even though the error resulted from a transient condition which had disappeared. Another prior art scheme attempted to isolate transient errors by re-executing instructions during the course of which an error occurred. If any instruction is recycled a predetermined number of times, the error is classified as a solid error and the system signals the operator that corrective action is necessary. If the error were only transient, the instruction would probably be repeated only once after which it would be successfully executed, no corrective action being necessary and no action being taken. However, due to the nature of program control systems, repetition of every instruction is not always possible. Instructions assume the existence of data within the system which data may be changed during the course of the execution of an instruction. If the instruction is repeated, then it acts, not upon the assumed data, but upon the data as changed during previous operations. Thus recycling of instructions without regard to changes in the data being operated upon can result in computational errors.

In the prior art, there are also found systems for recognizing different kinds of error conditions and for taking automatic corrective action in accordance with the error recognized. Thus indiscriminate repeating of instructions is avoided. For example if an error of one kind occurs a completely new program of instructions is called in to analyze the system and determine possible causes of the error. If another kind of error occurs, still another program is called in to perform the analysis, or possibly merely repeat the instruction during which the error occurred. However, such systems always require the execution of a "corrective" program to determine whether an error resulted from a transient malfunction or from a solid malfunction, any one of the error conditions possibly being caused by either one of these types of malfunctions. Further, in such systems, when an error occurs during the execution of an instruction, it is necessary to await the completion of the instruction before a corrective program is executed. This can be a very wasteful procedure since some instructions require a long time for completion. Another prior art device attempts to alleviate this problem by suspending execution of an instruction at the point at which an error condition occurs, calling in a special program for analysis immediately, and then later resuming execution of the suspended instruction. This scheme, however, always requires a program to separate transient errors from solid errors.

It is an object of this invention to provide apparatus for the distinguishing short-lived (transient) from long-lived (solid) errors.

Another object of this invention is to correct occurrences of errors in accordance with the recognition of the error as transient or solid.

Another object is to provide apparatus in a instruction controlled system for recognizing whether an instruction can be repeated, after the occurrence of an error, without destroying data in the system and without operating upon data modified to the point that it would give an erroneous result.

A further object of this invention is to provide apparatus in a program controlled system for selectively repeating instructions, or programs, or taking corrective action as determined by the classification of an error.

A still further object of this invention is to provide apparatus wherein the occurrence of an error during the execution of an instruction results in an immediate repetition of the instruction if the instruction indicates that it has not reached a point after which repetition is prohibited.

The foregoing and other objects, features and advantages of the invention will be apparent from the following more particular description of the preferred embodiment of the invention, as illustrated in the accompanying drawings.

In accordance with these objects there is provided, in a program controlled data processing system, means for signalling the occurrence of any selected errors. The cause of an error may be a transient or a solid malfunction in any one of the units monitored for errors. When an error occurs during the execution of an instruction, the instruction will be repeated only if it is still operating upon data in existence at the time that it started. An instruction modifies the data upon which it operates at a predictable time during its execution, which time differs for each instruction. Therefore, for each instruction, there is provided a signal during its execution indicating that the point has been reached after which point the instruction may not be repeated. If an error signal occurs before this point, the instruction is repeated immediately, no damage occurring to the data in the system and no problem existing as to the generation of erroneous results due to repetition of the instruction. If during repetition of an instruction no error results, the error can be assumed to have been transient and may be ignored. If during repetition of an instruction an error again occurs, usually immediately, then the error may be classified as solid and special corrective action, as taught in the prior art, taken. If the error occurs following the point after which the instruction cannot be repeated, the instruction must be completed so that data is not left partially operated upon. Further, the instruction cannot be repeated immediately after completion since it would operate upon data different than that which was assumed for the instruction. In this case it is not known whether the error was transient or solid and therefore there must be a programmed analysis using one of the prior art techniques.

The foregoing and other objects, features and advantages of the invention will be apparent from the following more particular description of the preferred embodiment of the invention, as illustrated in the accompanying drawings.

In the figures:

FIGURE 1*a* is a logic diagram showing a system embodying the invention.

FIGURES 1*b* and 1*c* are diagrams illustrating the formats of words used in the system of FIGURE 1*a*.

FIGURE 1*d* is a wave-form diagram illustrating the timing of the system of FIGURE 1*a*.

FIGURES 1*e*, 1*f* and 1*g* are timing diagrams illustrating the cycling of the system of FIGURE 1*a* during operation.

FIGURE 2*a* is a logic diagram showing the clock 10 in detail.

FIGURE 2*b* is a logic diagram showing the cycle timer 11 in detail.

FIGURE 2*c* is a logic diagram showing the interrupt timer 12 in detail.

FIGURE 3*a* is a logic diagram showing the repetition control 19 in detail.

FIGURE 3*b* is a table showing the operation of triggers in the repetition control 19 of FIGURE 3*a*.

GENERAL DESCRIPTION

The invention will be generally described with reference to FIGURES 1*a* through 1*g* and FIGURE 3*b* in connection with an electronic data processing system having a program interrupt feature of the type described in U.S. Patent 3,048,332, "Program Interrupt System," of F. P. Brooks, Jr., et al., assigned to the International Business Machines Corporation, which patent is incorporated herein by this reference. An electronic data processing system utilizing a magnetic core memory is described in U.S. Patent 3,036,773, "Indirect Addressing in an Electronic Data Processing Machine," of J. L. Brown, assigned to the International Business Machines Corporation, which patent is also incorporated herein by this reference. The invention may also be used with a variety of electronic systems, an electronic data processing system being described merely for purposes of illustration.

Briefly, the prior art system described in the referenced patents includes a memory 1 which stores a number of programs of instruction words and a plurality of data words. Referring to FIGURE 1*b*, an illustrative instruction word format includes a fifteen-bit operation code for specifying operations to be performed upon a data word, and a fifteen-bit data word address, specifying the location of the data word to be operated upon in accordance with the operation code of the instruction word. Referring to FIGURE 1*c*, a thirty-six bit data word is shown. The memory 1 stores instruction words and data words in randomly addressable locations, any one location being capable of holding either type of word.

Instruction words are distinguished from data words in accordance with the operation of a clock 10 and a cycle timer 11. Referring to FIGURE 1*d*, it can be seen that the clock 10 repeatedly generates a series of twelve pulses A0 through A11, the cycle timer 11 applying these signals to selected ones of I-time and E-time cables. When the cycle timer 11 applies the clock 10 pulses to the I-time cables they emerge as pulses I0 through I11 which are used to time removal of instruction words from memory 1, and to time interpretation of instructions removed from memory 1. Thereafter, when the cycle timer 11 applies the clock 10 pulses to the E-time cable, pulses E0 through E11 are used to time removal of a data word from the memory 1 and to time operations upon it in accordance with the previously removed instruction word. Every I-time is followed by one, or more, E-times. Thus, instruction words and data words are distinguished in the system under control of the cycle timer 11.

Successive instruction words are removed from the memory 1 in accordance with successive addresses contained in an instruction counter 4, each of which addresses is transferred to an address register 3 to bring an instruction from the memory 1 into a memory register 2. The instruction counter 4 is then changed, in anticipation of the complete execution of the previously addressed instruction, for later use in obtaining the next instruction. The current instruction word in the memory register 2 is transferred to the instruction register 6, from where the operation code portion is sent to an operation decoder 9. The operation decoder 9 generates a plurality of "commands" for each instruction. A combination of one or more commands and a timing signal from the cycle timer 11 causes operation of one, or more, word transfer gates in the system in accordance with controls 22. For example, a command may result, in accordance with the operation code of an arithmetic instruction to time entry information into an adder 5 at time E1, and another command may, at time E4, cause entry of the resultant sum from the adder 5 into an accumulator register 7. The controls 22 also signal a change from E-time to I-time (an EOP end of operation signal) and from I-time to E-time (GOE go to E-time signal). The commands and controls are completely explained in the referenced Brooks patent and need not be explained in detail here. The address portion of the instruction word in the instruction register is placed into the address register 3 to specify the location in the memory 1 wherein will be found a data word to be operated upon in accordance with the operation code of the instruction decoded by the operation decoder 9. The data word addressed by the address in the address register 3 is brought out of the memory 1 into the memory register 2 and is routed through the adder 5, the accumulator register 7 and a multiplier/quotient (M/Q) register 8, in accordance with the operation decoder 9 commands, at times controlled by the cycle timer 11. When execution of the current instruction is completed, the next instruction is removed from the memory 1, the cycle timer 11 having reverted to I-time, and these operations are repeated.

Still referring to FIGURE 1*a*, a program interrupt apparatus is shown, in association with the data processing system, comprising: an indicator register 13, an interrupt indicator 14, a mask register 15, a leftmost-one counter 16, an interrupt added 17, and a base address register 18. The indicator register 13 stores conditions, including errors, occurring in the machine and entered into the indicator register 13 via lines C1 through C36. The mask register 15 permits any desired ones of these conditions to be utilized for "interrupt" purposes. The interrupt indicator 14 transfers to the leftmost-one counter 16 an indication of only those conditions stored in the indicator register 13 which are selected by the mask register 15. The leftmost-one counter 16 acts as a priority circuit to select the highest priority one (the one operating condition which is physically furthest to the left), and also acts as an address generator to generate an address identifying the one selected condition. For example, if conditions C3, C5 and C36 are stored in the indicator register 13, and the mask register 15 selects conditions C5 and C36 (among others) but does not select condition C3, conditions C5 and C36 will be sent to the leftmost-one counter 16. The leftmost-one counter 16 will generate a number of identifying conditions C5, which is the one with the highest priority. This number will be combined in the interrupt adder 17 with another number, stored in the base address register 18, to specify a location in the memory 1 wherein will be found a special instruction which is used to initiate an interrupt program. As is described in the Brooks patent, different instructions are called for as a result of different conditions occurring in the machine. These instructions permit conditions in the machine to initiate, upon completion of the correct instruction during which the condition occurred, a new program of instructions starting at the location indicated by the interrupt adder 17. This is accomplished by storing the instruction counter 4 in the memory 1, to remember where the current program was interrupted, and then executing a different interrupt program of instructions by placing a new address into the instruction counter 4. When the interrupt program is completed, the instruction counter 4 is restored to its previous condition causing the interrupted program to continue from the point at which the interruption occurred. An interrupt timer 12 is normally operated, when an interruption is desired, to insert an extra cycle of operations in addition to those provided by the cycle timer 11. This causes the pulses from the clock 10 to be applied on an XI-time cable which supplies signals on lines XI0 through XI11. Referring to FIGURE 1*d*, the occurrence of an interrupt condition during a typical instruction cycle (comprising an I-time followed by an E-time) results in the performance of a partial instruction cycle (the I-time of the next instruction in the interrupted program) and an interrupt cycle (comprising an XI-time and an E-time cycle). The partial instruction cycle serves no purpose, it occurring because the system does not immediately react to the interrupt condition. The interrupt cycle is followed by a series of instruction cycles, which instructions are, however, part of another interrupt program.

A repetition control 19 is operated by some of the conditions C1 through C36 (selected by OR circuit 21) and by some of the gate operation signals from the controls 22, to control the data processing system to classify and correct errors. A logic circuit 20 is connected to selected ones of the gate operation lines of the controls 22 to generate a unique "do not repeat" (DNR) signal for each instruction during the execution of the instruction. The inputs to the logic 20 are chosen in such a way that the DNR signal is generated for every instruction prior to the point at which the instruction operates upon the data word indicated by its address portion in such a way as to make repetition of the instruction undesirable. For example, a clear and add (also "reset add") instruction brings a data word out of the memory 1, clears the accumulator register 7 (by setting it to zeros) and places the word into the accumulator register 7. It is obvious that this instruction does not in any way assume the existence of data in the accumulator register 7, since it destroys, as part of its operation, whatever data there is. Therefore, the clear and add instruction may be repeated by starting the instruction at any point during its execution without affecting the result. The DNR signal may therefore be placed at the very end step (at E11 time) of the instruction, as illustrated in FIGURE 6*q* of the referenced Brooks' patent. On the other hand, an add instruction assumes the existence of one operand in the accumulator register 7. Therefore, as soon as the instruction takes a step which would change the contents of the accumulator register 7, the instruction cannot be repeated without resulting in an incorrect sum. The add instruction brings an operand into the adder 5 at E1 time but does not pass a result to the accumulator register 7 until E4 time, as illustrated in FIGURE 6*k* of the referenced Brooks' patent. Therefore, the add instruction may be repeated after the occurrence of E1 time but not after the occurrence of E4 time. Thus for the add instruction the DNR signal will occur at some time prior to E4 time.

Another input to the repetition control 19 is a signal E10 from the cycle timer 11, which signal is used to advance the instruction counter 4 to the next instruction. Assuming that an instruction is to be repeated, it is necessary to know whether the instruction counter 4 has, or has not, been incremented. If the instruction counter has been incremented (that is, if a signal E10 has occurred), it must be decremented (by a signal on line IC—1) to block execution of the next sequential instruction before the instruction can be repeated.

The repetition control 19 has an output reset CC which is connected to the clock 10 to make the clock 10, the cycle timer 11 and the interrupt timer 12 operable to repeat the current instruction as will be explained below. The repetition control 19 has an output IC—1 which is operable to cause the instruction counter 4 to be decreased by one in the event that the next sequential instruction is to be blocked and the current instruction is to be repeated after the instruction counter 4 has been incremented. The instruction counter 4 is thus made to identify the current instruction instead of the next instruction. The repetition control 19 also has an output to the line C2 of the indicator register 13 for indicating the occurrence of a solid malfunction which requires a corrective program to be inserted by the interrupt apparatus. The repetition control 19 is connected to the indicator register 13 line C1 to signal it if there is an error (which may be either solid or transient) occurring too late to repeat an instruction. This causes the interrupt system to take appropriate corrective action, such as repeating the past few instructions. There is an output from the repetition control 19 labeled INT for enabling the interrupt circuits of the data processing system when signals are present on either of the lines C1 and C2.

Referring to FIGURE 3*b*, the repetition control 19 comprises two stores (a "do not repeat" DNR trigger and an "instruction counter incremented" ICT trigger) and an error counter operated by the inputs DNR, E–10, E–11 and I–0 upon the occurrence of an error in a manner which classifies and corrects errors in the system. The DNR trigger and the IC+1 trigger are initially set to the one state. When during the execution of an instruction the point after which the instruction cannot be repeated is reached, the DNR trigger is reset to the zero state. When, during execution of an instruction, the instruction counter is incremented the IC+1 trigger is reset to the zero state. If an error occurs in the system while the DNR trigger is set to the one state the instruction will be repeated by placing a signal on the reset CC line to cause the clock 10 and the cycle timer 11 to recycle. If, due to stepping of the instruction counter 4, the IC+1 trigger was set to the zero state prior to the occurrence of the error, a signal is also placed on the IC—1 line to decrement the instruction counter 4. The error counter is incremented whenever an instruction is repeated. If the same instruction has been repeated three times, (as a result of a solid malfunction) the error counter will contain the value three, at which time signals will appear on lines C2 and INT to cause the interrupt circuit to take corrective action. If an error (either solid or transient) occurs after the no-repetition point, indicated by the DNR signal of an instruction, the instruction is not repeated but is permitted to progress to completion. When the instruction is completed, an IC—1 signal and an INT signal occur to cause the interrupt circuits to take corrective action. Correction action in this latter case may involve repetition of several previous instructions of the program, which are chosen to insure that the data assumed to exist in the computer by the current instruction does in fact exist when the current instruction is reached during this repetition of a section of the program.

Operation of the apparatus shown by the logic diagram of FIGURE 1*a* will now be described with reference to FIGURES 1*b* through 1*g* and FIGURE 3*b*. A series of instructions numbered 1 through 20 is assumed to be part of the normal program stored in the memory 1 at locations 1 through 20 for use by the data processing system. A special interrupt program is stored in locations 25 through 50 of the memory 1, which program is used in the event of a solid malfunction. Another special interrupt program is stored in memory 1 locations 51 through 71 for the purpose of controlling the repetition of a normal program section if an error occurs during execution of a current instruction at a time too late to permit repetition of the current instruction. During normal operation, one instruction is transferred from memory 1 through the memory register 2 to the instruction register 6 under control of signals on lines I0 through I11 from the cycle timer 11 during the I-time portion of each instruction cycle. The operation code of the instruction in the instruction register 6 is decoded in the operation decoder 9 and the address portion of the instruction is sent to the address register 3. The controls emit a GOE signal which ends the I0 through I11 signals and initiates E0 through E11 signals from the cycle timer 11. During the E-time portion of the instruction cycle the data word indicated by the data word address portion of the instruction word is passed through the memory register 2 to the arithmetic units comprising the adder 5, the accumulator register 7 and the M/Q register 8. These operations are performed by instructions during the execution of which the occurrence of the point of no return is marked in FIGURES 1*e* through 1*g* by a line and an indication of the time of occurrence. Instructions 1 through 3 are executed without incident. During the execution of instruction 4 a signal occurs on the error input to the repetition control 19 at time E5 as a result of one of the conditions in the machine monitored by the OR circuit 21. The DNR signal for instruction 4 does not occur until time E7. As a result, trigger DNR in the repetition control 19 is reset to the zero state placing a signal on the reset CC line which immediately resets the clock 10 and the cycle timer 11 to their initial states to cause a repetition of instruction 4. The instruction counter 4 is not stepped until after time E7 so that the IC+1 trigger in the repetition control 19 remains set to the one state. (If the instruction counter 4 had been stepped to indicate the address of the next instruction (instruction 5) prior to the occurrence of the error, the trigger IC+1 in the repetition control 19 would have been reset to the zero state resulting in a signal on repetition control line IC−1 to cause the instruction counter 4 to be decremented prior to repetition.) Instruction 4 is successfully repeated without the re-occurrence of an error. Therefore the error is classified as a transient error and subsequent operation of the system is unaffected.

FIGURE 1*f* illustrates the occurrence of an error (at time E8) after the instruction 4 has reached the point of no return (at time E7). When a signal on the error line to the repetition control 19 occurs, trigger DNR has already been reset to the zero state so that instruction 4 is not immediately repeated. Instead, there will be a signal at the repetition control 19 outputs C1 and INT, signaling the interrupt circuitry after completion of instruction 4. Upon the completion of instruction 4, the interrupt timer 12 is signaled on line IRPT from the interrupt indicator 14 to initiate an interrupt cycle. A partial instruction cycle is in the interim performed for instruction 5 (though it has no effect). The leftmost-one counter 16 enters a number identifying condition C1 into the interrupt adder 17 and the base address register 18 enters a number into the interrupt adder 17 calculated to transfer control of the system from the current normal program to the special interrupt program starting at memory location 51. In this case, the special program eventually causes the instruction counter 4 to be reset to indicate instruction 2 in the normal program; the normal program being repeated from the point at which the contents of the accumulator and M/Q registers are known to be the same as the data assumed to exist by instruction 4. Instruction 4 will be successfully repeated, since the error is the result of a transient malfunction. If, on the other hand, the error had been a solid error, an error signal will probably be present during the instruction 5 partial instruction cycle to cause three repetitions of instruction 5 (since the DNR signal for instruction 5 occurs later) resulting in a "solid" interrupt request, which will now be described.

FIGURE 1*g* illustrates the occurrence of a solid error during the second E-time of instruction 3. The error is transmitted to the repetition control 19 via the error line at time E5 which is prior to a DNR signal (at time E8) from the OR circuit 20. As a result there will be a signal on the reset CC line from the repetition control 19 causing clock 10 and the cycle timer 11 to repeat instruction 3 in the same manner as explained with reference to FIGURE 1*e*. However, in this case the error is still present when instruction 3 is repeated causing still another signal to occur on the reset CC line. Each time that a signal occurs on the reset CC line the error counter is incremented by one. After the third attempt to execute instruction 3 the error counter will contain a 3, causing signals on the line C2 and line INT from the repetition control 19. The signal on line C2, in addition to requesting service from the interrupt circuitry causes an immediate termination of the current instruction 3 (the instruction counter 4 has not been stepped) so that the interrupt circuitry immediately causes a partial instruction cycle, an interrupt instruction cycle and, subsequently, a transfer to a special solid-malfunction corrective program starting at location 25.

DETAILED DESCRIPTION

Figure 1A:
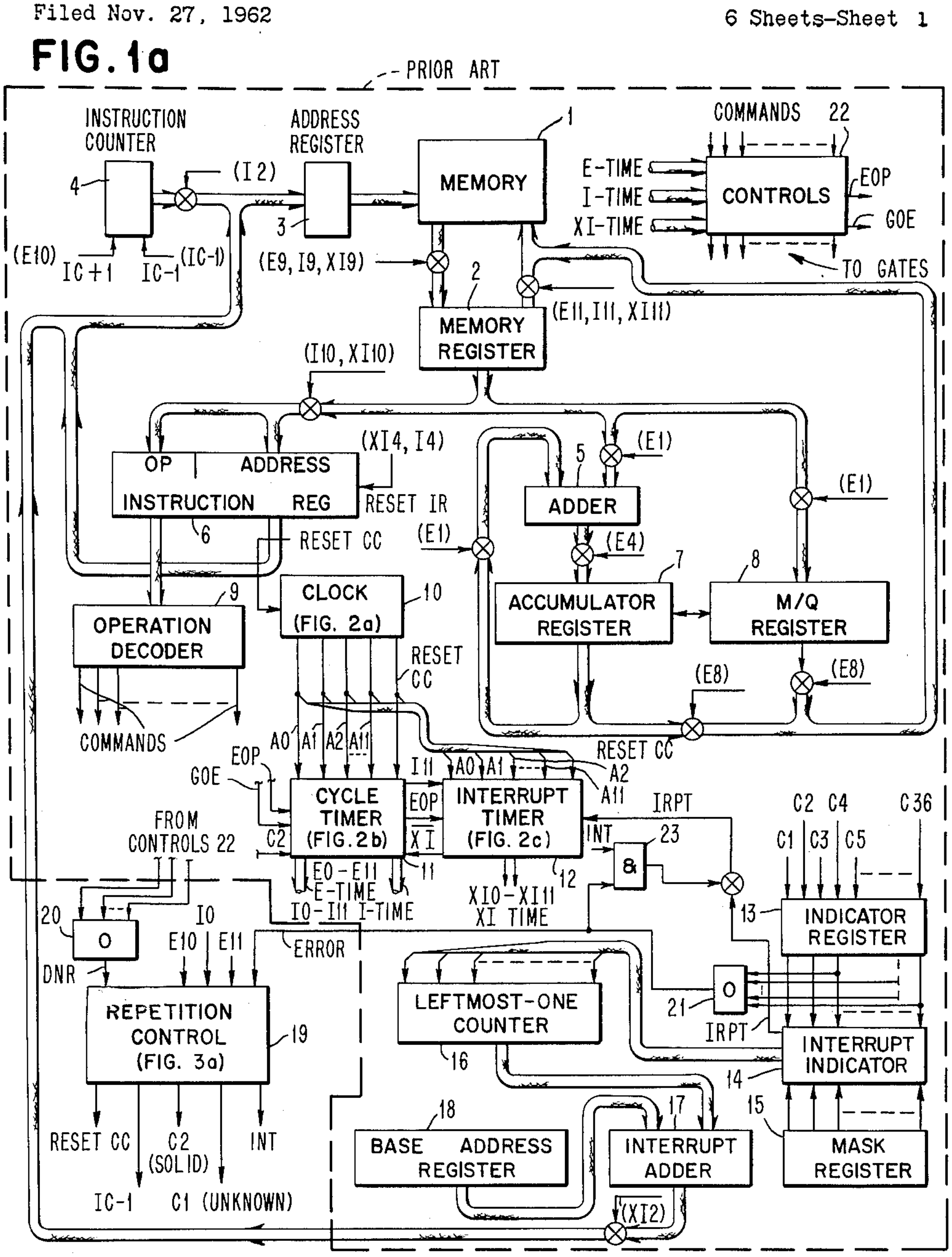

*Data processing system.*—Referring to FIGURE 1*a*, the data processing system shown in a parallel binary computer operating upon 36-bit data words in accordance with programs comprising 36-bit instruction words stored in a memory 1. The memory may be constructed of electrostatic stores as described in U.S. Patent No. 2,950,465, "Electronic Data Processing Machine," to Philip E. Fox and assigned to the International Business Machines Corporation, which patent is incorporated herein by this reference, or the memory 1 may utilize magnetic core stores of the type described in U.S. Patent No. 3,036,773 to Brown, referred to previously.

Figure 1B:
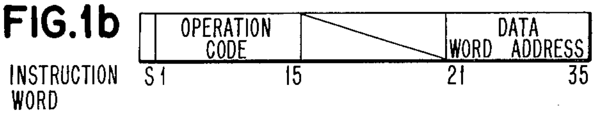
Figure 1C:
Figure 1D:
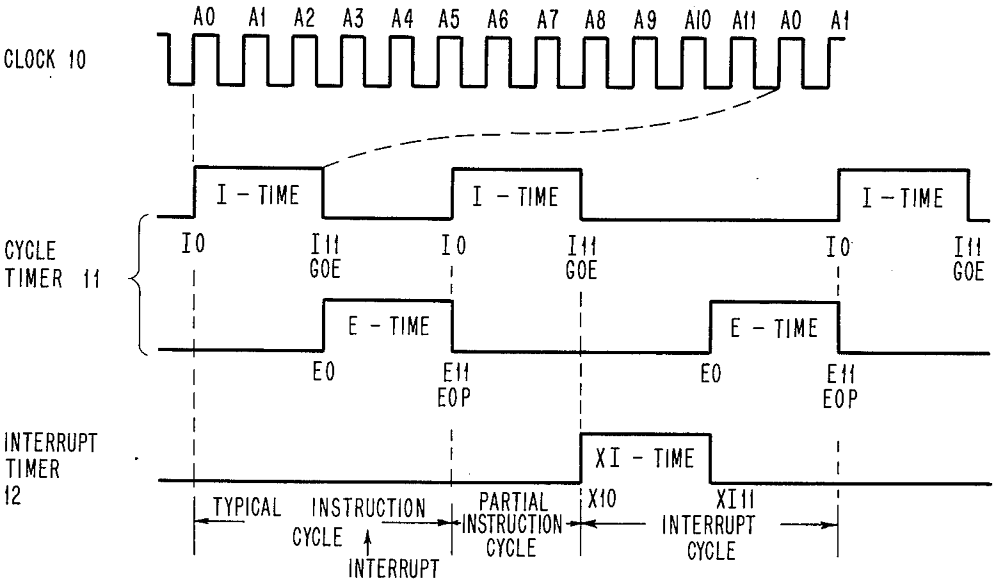

The memory 1 contains a plurality of addressable locations, each location containing either a data word of the type shown in FIGURE 1*c* or an instruction word of the type generally shown in FIGURE 1*b*. The contents of any location in memory 1 may be accessed by placing a number, specifying the address of the location, in the address register 3. The address register 3 is composed of bi-stable circuits connected in any well known manner, explained for example in the referenced Brooks Patent No. 3,048,332 and Brown Patent No. 3,036,773. One of the sources of addresses placed into the address register 3 is an instruction counter 4 which supplies a series of addresses indicating the locations of successive instructions forming a program. The instruction counter 4 is a register for storing a quantity which may be incremented by one upon application of a signal on the line IC+1 or decremented by one upon application of a signal on the line IC−1. Count-up count-down counters are well known in the art and need not be described here. The contents (either a data word or an instruction word) of the memory 1 addressed by the contents of the address register 3 are entered into a memory address register 2 (usually) in a 36-bit parallel transfer via a gate. The contents of the memory register 2, if an instruction word, are transferred to the instruction register 6 and, if a data word, are transferred to the adder 5 or the M/Q register 8. Data words stored in the memory register 2 are transferred either to the adder 5 or the M/Q register 8 depending upon the operation called for by the current instruction word. The adder 5 and the M/Q register 8 operate in conjunction with an accumulator register 7 to perform arithmetic and logic operations of many kinds as described in the referenced Brooks Patent No. 3,048,332 and Brown Patent No. 3,036,773. It is not felt necessary to describe at this time any of the operations performed by these units since they are not essential to the operation of the invention. The results of the operation are (usually) placed directly into the memory 1.

The instruction register 6 is a 36-bit register of standard construction which may be reset to all zeros by means of a signal on line reset IR. The instruction word contained in the instruction register 6 includes an address portion, which is sent to the address register 3, and an operation portion which is sent to an operation decoder 9. The purpose of the operation decoder is to convert the fifteen bits (a number merely used for illustration here) of the operation code to a larger number of commands which are used by controls 22 in conjunction with timing signals to operate gates. The operation decoder 9 and controls 22 are described in detail in the Brooks Patent No. 3,048,332 and Brown Patent No. 3,036,773 referenced above. The controls 22 emit two signals end of operation (EOP) and go to E-time (GOE) which will be described in more detail below.

A clock 10, cycle timer 11 and interrupt timer 12, all of which will be explained in more detail with reference to FIGURES 2*a*, 2*b* and 2*c*, serve to generate three separte sequences of twelve timing pulses each. One I-time sequence of timing pulses I0 through I11 from the cycle timer 11 is used to control manipulation of each instruction word received from the memory 1. One, or more, E-time sequences of timing pulse E0 through E11 from the cycle timer 11 are used to control processing of data words received from the memory 1 in accordance with each instruction word. An XI-time sequence of pulses XI0 through XI11 from the interrupt timer 12 is used in conjunction with a subsequent sequence of I-time pulses to control the interruption of a current program and the initiation of an interrupt program. The outputs of the operation decoder 9, the cycle timer 11 and the interrupt timer 12 are applied to the controls 22 which operate gates controlling word transfers in the system. The controls 22 basically comprise AND circuits, one or more of which will have an output at any one time as a function of a particular time pulse from the cycle timer 11 or the interrupt timer 12 and one or more commands from the operation decoder 9. In FIGURE 1*a*, the gates operated by the controls 22 are shown as symbols ⊗. A gate is operated when both a specified timing pulse and one, or more, specified commands occur simultaneously. For simplicity, however, only the times at which each gate is operated are shown, it not being specified for which particular commands the gate is operated.

The functions of the controls 22 will be briefly explained by illustrating a typical operation of the word transfer gates shown in FIGURE 1*a*. Initially, a sequence of twelve pulses I0 through I11 emerges on the I-time cable of the cycle timer 11. At I2 time the contents of the instruction counter 4 are transferred to the address register 3 causing accessing of the contents of the indicated location in memory 1. At time I4 the instruction register is reset to all zeros. At time I9 the addressed word in memory 1 is transferred to the memory register 2. At time I10 this word is transferred from the memory register 2 to the instruction register 6. The memory register 2 contents are regenerated in the memory 1 at time I11. The operation code position of the word in the instruction register 6 (which is of necessity interpreted as an instruction word whether it is one or not) is entered into the operation decoder 9 to generate a plurality of commands, while the address portion is transferred to the address register 3 to specify the location of a data word. Coincident with the last one of the I-time pulses, pulse I11, a GOE signal from the controls 22 causes the cycle timer 11 to go to E-time resulting in a series of pulses E0 through E11 on the E-time cable. At E9 time the addressed location contents are transferred into the memory register 2, and are, at E11 time regenerated in memory 1. The operation decoder 9 may (but does not in this example) at this time E11 indicate a signal on the EOP line from the controls 22 to indicate the complete execution of the current instruction. In this illustration, a second sequence of E-time pulses is necessary to completely execute the current instruction. Therefore, when the E11 pulse occurs another sequence of E-time pulses E1 through E11 emerges from the cycle timer 11 on the E-time cable. During the second E-time sequence, at time E1, the contents of the memory register 2 are entered into the memory adder 5 (or into the M/Q register 8 if desired), to be combined with the previous contents (if any) of the accumulator register 7. The results of this addition are entered into the accumulator 7 at time E4. The contents of the accumulator register 7 (or the M/Q register 8) may be sent to the memory at time E8. At time E10 the instruction counter 4 is increased by one to specify the next instruction. A signal appears, at time E11, on the EOP line from the controls 22 causing the cycle timer 11 to initiate a sequence of signals on the I-time cable.

The program interrupt circuits, described in detail in the referenced Brooks Patent No. 3,048,332, recognize selected conditions (including errors) in the system, giving them effect, one by one in priority order, by interrupting the current program being executed by the data processing system and initiating a new program (which may be different for each condition). Interrupt operations include word transfers through gates operated by XI-time pulses XI0 through XI11 from the interrupt timer 12 and E-time pulses E0 through E11 from the cycle timer 11. Though the normal sequence of pulses is one I-time sequence followed by one, or more, E-time sequences, the occurrence of an interrupt causes an XI-time sequence to be inserted between an I-time and an E-time sequence. The operation of the interrupt circuits has been previously described generally herein and in detail in the referenced Brooks Patent No. 3,048,332 and will not now be repeated.

There are, however, two changes to the system described in the Brooks Patent No. 3,048,332 which changes will be described here. The occurrence of a condition on selected ones of the lines C1 through C36 are sensed by an OR circuit 21 which causes a signal to appear on an error line connected to repetition control 19 (which is explained in more detail in FIGURE 3*a*). If any one of the sensed conditions occurs, of if more than one of the sensed conditions occurs, an error signal is immediately generated. Further, the indication of the need for an interrupt cycle (which is a condition precedent to a program interrupt and is usually indicated by an IRPT signal from the interrupt indicator 14), is passed through a gate which is operated only when: (1) an INT signal is available from the repetition control 19 and (2) if one of the conditions monitored by the OR circuit 21 is the cause of the interrupt. An AND circuit 23 enables a gate to pass the IRPT signal from the interrupt indicator 14 to the interrupt timer 12 only when there is a coincidence of signals on its error and INT inputs. This permits the application of the IRPT signal to the interrupt timer 12 whenever a condition monitored by the OR circuit 21 occurs. If the condition is not one of those monitored by the OR circuit 21 the gate remains disabled, preventing the application of an IRPT pulse to the interrupt timer 12. It is obvious that simple modifications would permit unmonitored conditions to cause interrupts independently of the operation of the gate in the IRPT line.

Figure 2A:
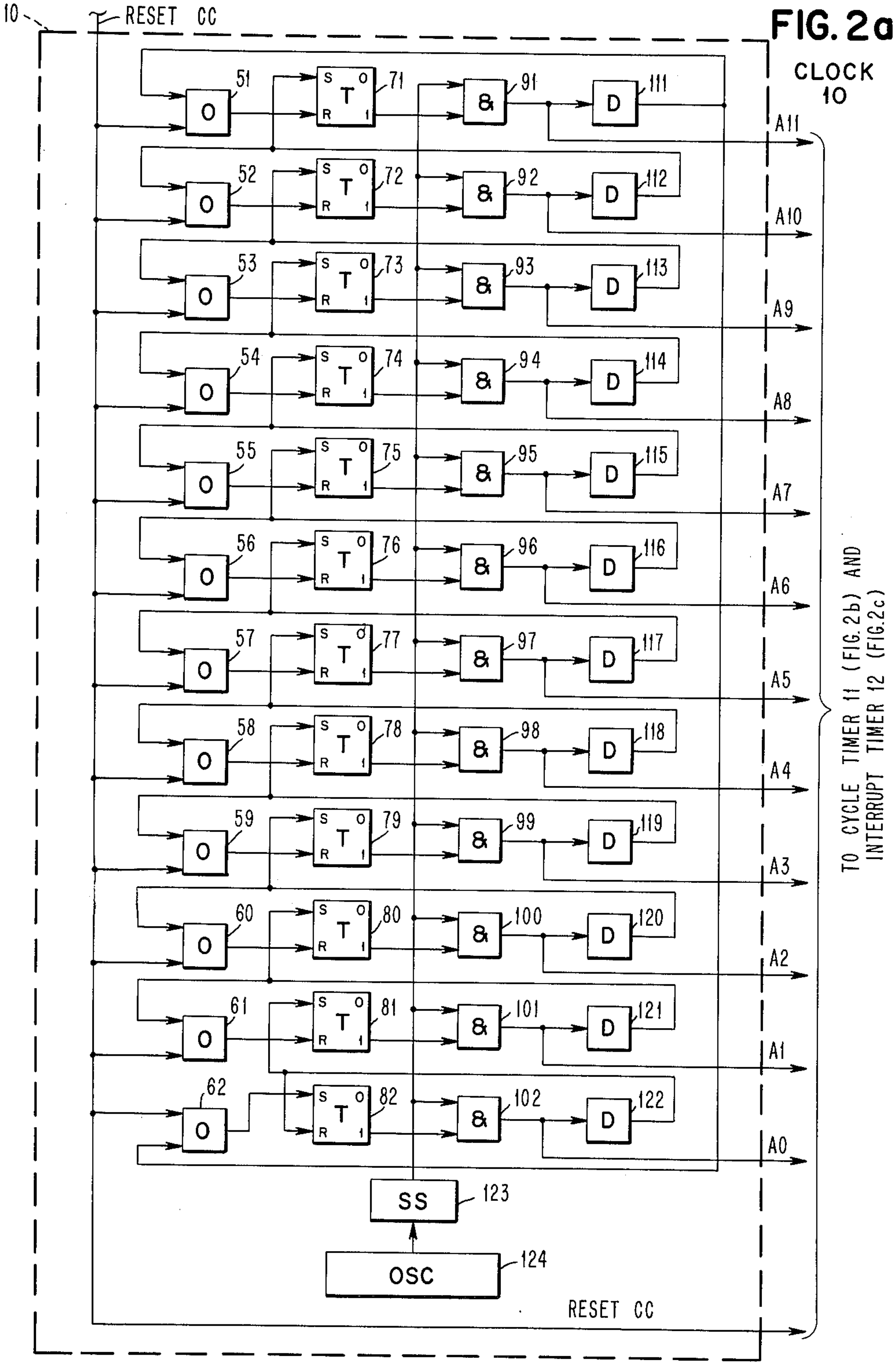

*Clock 10.*—Referring to FIGURE 2*a*, there is shown a logic diagram of one circuit that may be used to perform the functions of the clock 10. The purpose of the clock 10 is to apply a signal to each one of twelve lines A0 through A11 in sequence, starting with line A0 and repeating the sequence after line A11. The clock 10 includes triggers 71 through 82 each of which may be set to the zero state by application of a signal to its reset R input and each of which may be set to the one state by a signal at its set S input. The circuit is designed so that only one of the triggers 71 through 82 is set to the one state at any one time. The outputs of the triggers 71 through 82 are applied to respective ones of AND circuits 91 through 102. There will be an output from the one AND circuit which corresponds to the single trigger which is set to the one state, each time that a pulse from an oscillator 124 causes operation of a single shot SS 123. The duration of the output pulse is determined by the period of the singel shot 123. There are provided delay lines 111 through 122 connecting the outputs of corresponding ones of the AND circuits 91 through 102 to the set inputs of one adjacent trigger and connecting the outputs of the AND circuits to the reset inputs of the corresponding triggers via OR circuits 51 through 62.

The relative timing of the oscillator 124, the duration of operation of the single shot 123 and the delay of the delay lines 111 through 122 are adjusted so that for each oscillator 124 pulse the signals stored in one of the triggers 71 through 82 will be transferred through its corresponding AND circuit and delay circuit to set the next succeding trigger to the one state and via its OR circuit to reset itself to the zero state. For example, if trigger 79 is initially set to the one state, the occurrence of an oscillator 124 signal causes a signal to be transferred via the AND circuit 99 and the delay line 119 to the set input of trigger 78 and to the reset input of trigger 79. If the highest order trigger 71 is set to the one state, the next succeeding pulse from the oscillator 124 transfers the one state from trigger 71 to trigger 82. For each pulse of the oscillator 124 there will emerge for a duration of time determined by the single shot 123, a pulse on one of the lines A0 through A11 corresponding to the one trigger which is at that time set to the one state. The triggers 71 through 82 may be reset, no matter what their current states, to a condition placing only trigger 82 (and thus line A0) in a one state by application of a signal on line reset CC. The outputs A0 through A11 and the line reset CC are connected to both the cycle timer 11 and the interrupt timer 12.

Figure 2B:
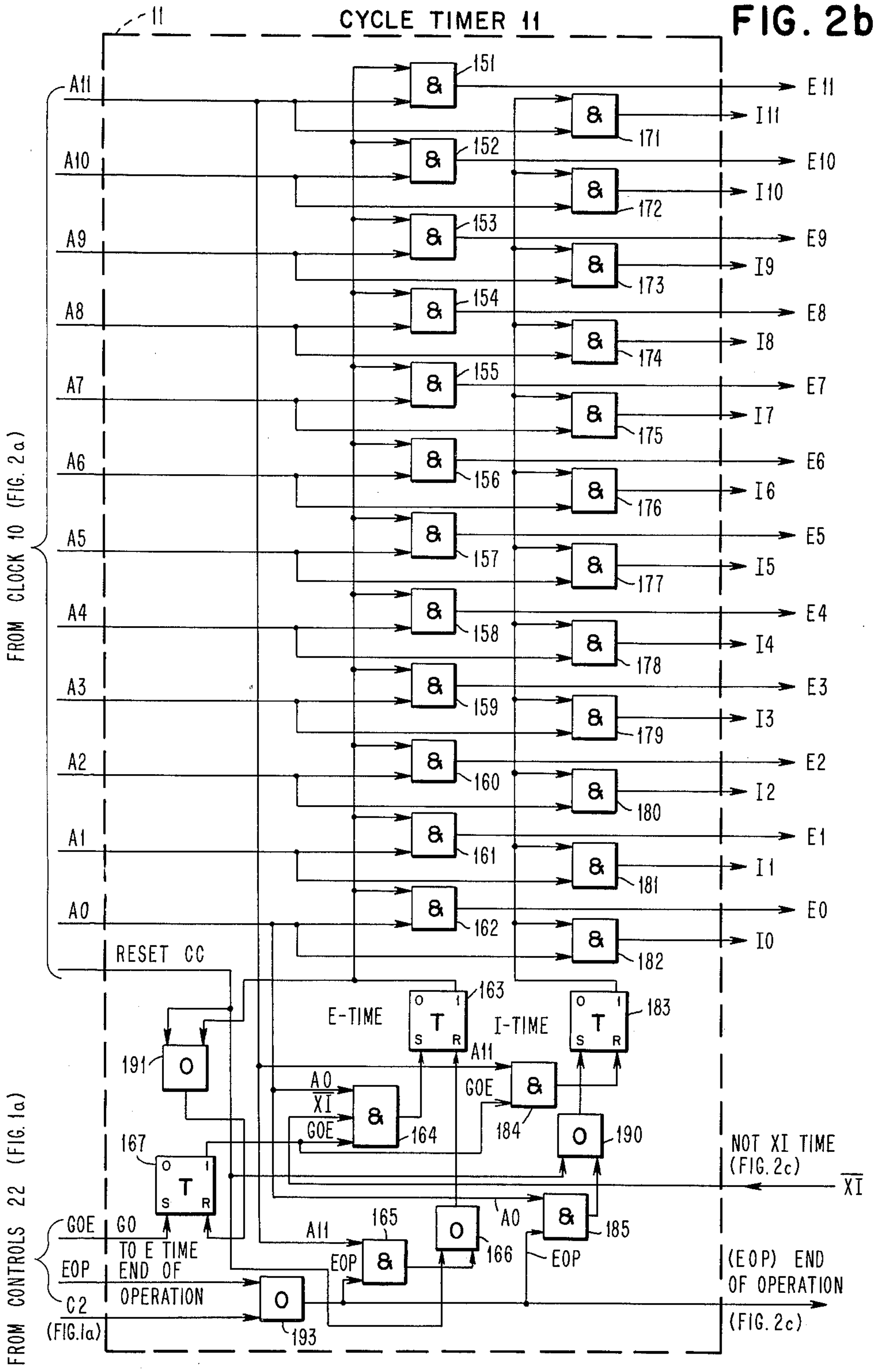

*Cycle timer 11.*—Referring to FIGURE 2*b*, there is shown a logic diagram of one circuit which may be used to perform the functions of the cycle timer 11. The cycle timer 11 receives signals A0 through A11 from the clock 10 and places them on one or the other of the I-time and T-time cables which emit signals 10 through I11 and E0 through E11, respectively. In general, signals are placed on lines I0 through I11 after the receipt of an EOP signal from the controls 22, and a GOE signal from the controls 22 causes signals to be placed on lines E0 through E11. If there is a reset CC signal from the clock 10 a signal will appear on line I0 regardless of the previous state of operation of the cycle timer 11.

Three triggers 163, 167 and 183 control operation of the cycle timer 11. Normally, one of the triggers 163 and 183 is set to the one state. However, during an interrupt operation (indicated by the absence of a signal on the not XI time line), as will be explained, neither of the triggers 163 and 183 is set to the one state. In no case will both triggers 163 and 183 be set to the one state at the same time. Assuming that initially the triggers 167 and 183 are set to the zero state and that the trigger 163 is set to the one state, signals on lines A0 through A11 will be applied via AND gates 151 through 162 to outputs E0 through E11. If an EOP signal is emitted by the control 22, it is received by an OR circuit 193 which enables AND circuit 165 and AND circuit 185. At time A11 (which causes pulse E11 at the end of the current E-time) there will be an output from AND circuit 165 to reset trigger 163 to the zero state via OR circuit 166 terminating outputs on the lines E0 through E11. The next signal from clock 10 will appear from input A0 enabling AND circuit 185 which sets the trigger 183 to the one state via OR circuit 190. As a result, the signals on lines A0 through A11 will leave the cycle timer 11 on lines I0 through I11 by way of the AND circuits 171 through 182. When a signal appears on the GOE line from the controls 22, a trigger 167 is set to the one state, causing one input of AND circuit 164 and one input of AND circuit 184 to be enabled. When at the end of the current I-time the pulse A11 occurs, there will be an output from AND circuit 184 causing trigger 183 to be reset to the zero state, which prevents outputs from occurring on any of the lines I0 through I11. The next signal from the clock 10, which occurs at input A0, is applied to AND circuit 164. Assuming that the system is not requesting a program interrupt, (as is indicated by a not XI-time signal, $\overline{\text{XI}}$ to be explained in detail below) there will be an output from the AND circuit 164 which sets the trigger 163 to the one state. This re-enables AND circuits 151 through 162 to permit outputs on lines E0 through E11, as previously described, and also causes the trigger 167 to be reset via OR circuit 191. If there is a reset CC signal from the clock 10, E-time is immediately ended and I-time is initiated; that is, the triggers 163 and 167 are reset to the zero state via the OR circuits 166 and 191 and the trigger 183 is set to the one state via the OR circuit 190. Since, as previously described with reference to FIGURE 2*a*, the clock 10 is at this time made to supply a signal on line A0, the first signal to emerge from the cycle timer 11 will appear on line I0. The occurrence of a C2 interrupt condition as a result of solid error (as will be explained in detail below), imitates the effect caused by an EOP signal from the controls 22. Thus, if a C2 interrupt occurs, corrective action (which normally awaits completion of the current instruction) may progress immediately since the current instruction is prematurely terminated by resetting the trigger 163 to the zero state and then setting the trigger 183 to the one state.

Figure 2C:
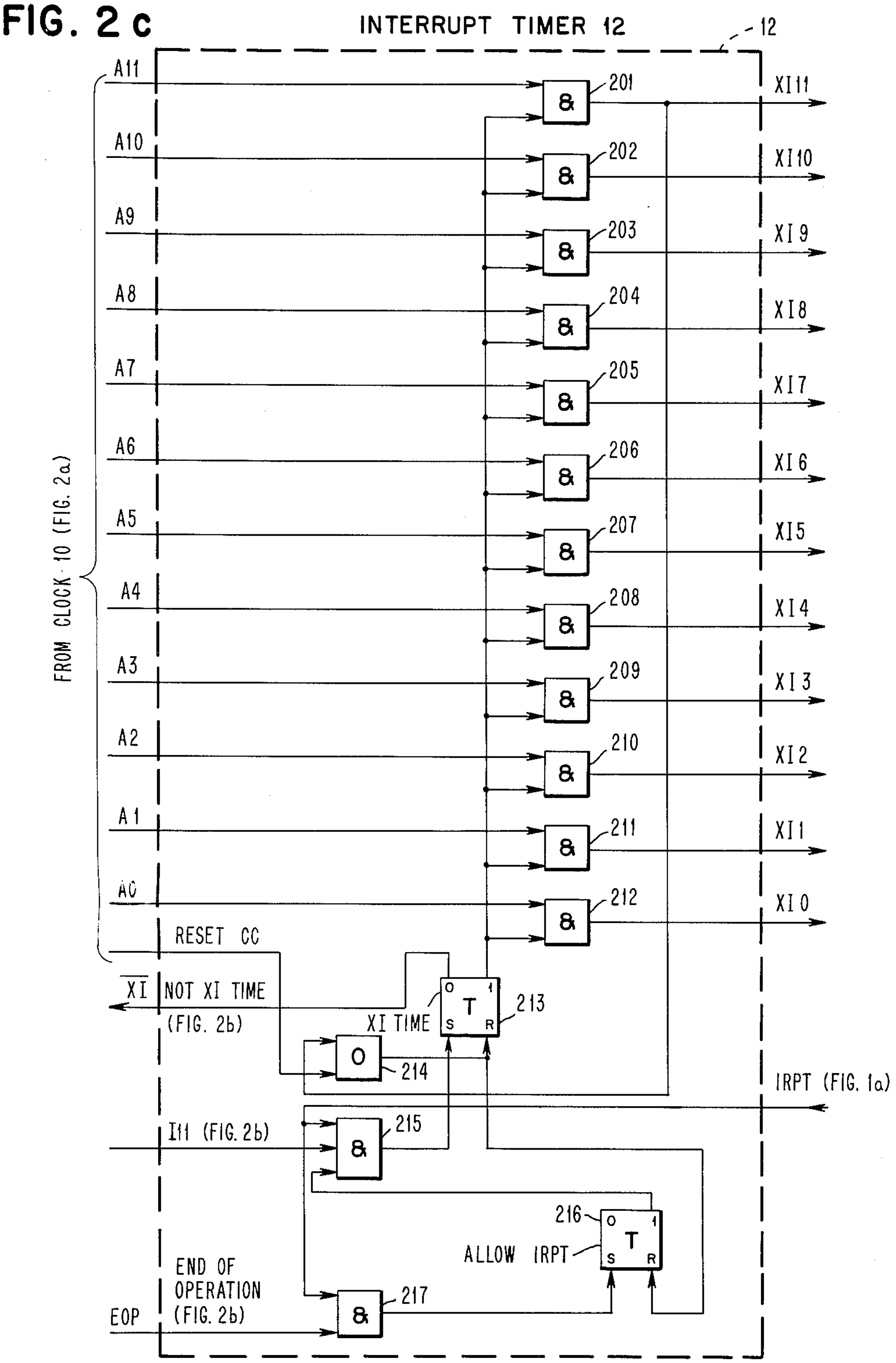

*Interrupt timer 12.*—Referring to FIGURE 2*c*, a circuit which may be used to perform the functions of the interrupter timer 12 is shown in logic diagram form. When an interrupt is indicated by an error signal on the IRPT line from FIGURE 1*a*, a signal is sent via the $\overline{\text{XI}}$ line to the cycle timer 11 to prevent it from causing an E-time and substituting XI time signals on lines XI0 through XI11. A trigger 213 is normally reset to the zero state to maintain a signal on the $\overline{\text{XI}}$ line, permitting the cycle timer 11 to generate E-time signals as previously described. When an interrupt condition occurs, a signal will appear on the IRPT line to enable AND circuit 215. In general, interrupt conditions are not recognized until the end of the instruction during which they occur. When an EOP signal from the controls 22 indicates the end of an instruction during which an IRPT signal occurred, there will be an output from an AND circuit 217 to cause a trigger 216 to be set to the one state. As previously explained with reference to the general description, when an interrupt is requested, one I-time of the next instruction is nevertheless performed before an interrupt XI-time is taken. The end of this partial instruction cycle is indicated by a signal on line I11 which signal is applied to AND circuit 215 causing the trigger 213 to be set to the one state. As a result, the signal normally present on the $\overline{\text{XI}}$ line drops, preventing the trigger 163 in FIGURE 2*b* from assuming the one state. However, trigger 183 in FIGURE 2*b* is set to the zero state, so that both triggers 163 and 183 are placed into the zero state, preventing generation of both E-time and I-time pulses. The one state of trigger 213 is applied to AND circuits 201 through 212 causing outputs to occur on lines XI0 through XI11 in accordance with the signals present on lines A0 through A11 from the clock 10. At time XI11, a signal is applied to OR circuit 214 causing the trigger 213 to be reset to the zero state which, in FIGURE 2*b*, enables the AND circuit 164 to set the trigger 163 to the one state, the previous GOE signal (which occurred during the partial instruction cycle I-time preceding XI-time) having been stored in the trigger 167. Thus an E-time will follow the XI-time. Note that if a reset CC signal occurs while the trigger 213 is set to the one state, it is immediately reset to the zero state by the OR circuit 214, thus insuring that the system recycles from time I0 regardless of the signal current at the time that a reset CC pulse occurs.

Figures 3A, 3B:
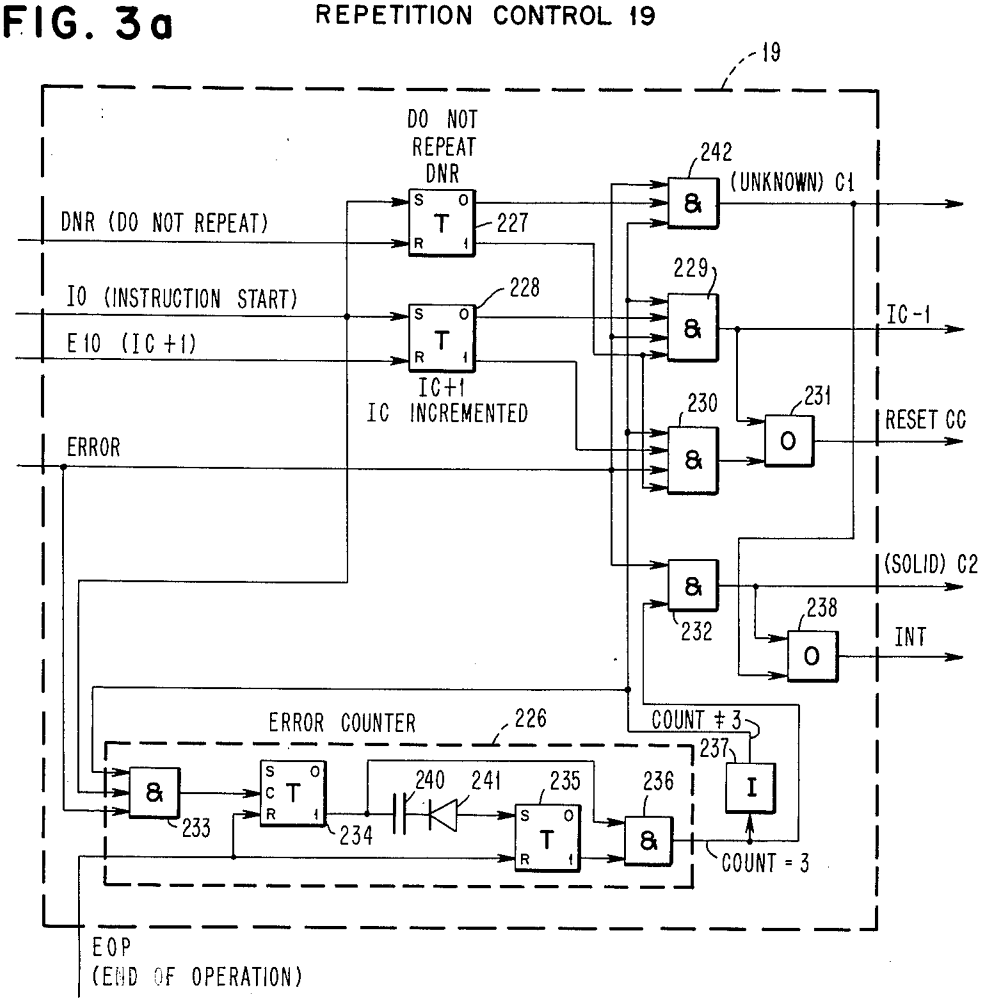

*Repetition control 19*.—The repetition control 19 is illustrated by a logic diagram in FIGURE 3*a* and is explained by a table shown in FIGURE 3*b*. The repetition control 19 controls the repeating of instructions and the initiation of program interrupts as a function of information concerning the progress of the current instruction and the occurrence of errors during the execution of the current instruction. Each instruction at some point during its execution causes a signal to be applied on the do-not-repeat line DNR indicating that a point has been reached after which the instruction cannot be repeated without giving an erroneous result. Prior to the completion of every current instruction an IC+1 signal is generated at E10 time which increments the instruction counter 4 to indicate the address of the next instruction in the program. The start of every instruction is indicated by a signal on the I0 line received from the cycle timer 11. The end of each instruction is indicated to the repetition control 19 by an EOP signal from the controls 22.

Initially, at the beginning of each instruction, a signal appears on the I0 input to set trigger 227 and trigger 228 to the one condition. Subsequently, at some point which is separately fixed for each instruction, a signal will occur on the DNR line indicating that the repetition point for the current instruction has been passed; the DNR signal causing the trigger 227 to be reset to the zero state. During the execution of each instruction at E10 time, the instruction counter 4 will be incremented, a fact recorded by resetting the trigger 228 to the zero state. If during the execution of an instruction an error occurs, a signal will appear on the error line.

An error counter 226 is arranged to be incremented by one each time that an error occurs during the same instruction. At the end of each instruction, which is indicated by an EOP signal, the error counter 226 is set to the decimal value zero by resetting triggers 234 and 235 to the zero state. The presence of an error at the beginning at an instruction (at I0 time) causes AND circuit 233 to pass a signal to a trigger 234, if the error counter 226 does not contain the number 3. (If the error counter 226 contains the number 3, a zero output from inverter 237 will block the AND circuit 233.) Each successive I0 time during the existence of an error signal from the AND circuit 233 to complement the trigger 234 pulses at I0 time occur in rapid succession when there is an error, no instruction progressing to the point at which an EOP signal is generated, as will be explained. Whenever the trigger 234 is changed to the one state from the zero state, a signal is applied to the set input of a trigger 235 via a capacitor 240 and a diode 241. The capacitor 240 and diode 241 will not pass a pulse to the trigger 235 when the trigger 234 changes from the zero state to the one state. The second complementing of the trigger 234 causes the trigger 234 to change to the zero state, which change applies a pulse via the capacitor 240 and the diode 241 to the set input of the trigger 235 setting it to the one state. When the trigger 234 is complemented for the third time, the trigger 235 remains set to the one state and both inputs to an AND circuit 236 are enabled, an output line indicating that one instruction has been repeated three times. This signal is applied to AND circuit 233 via inverter 237 to prevent further stepping of the error counter 226.

AND circuits 242, 229, 230 and 232 receive signals from the error counter 226 and the triggers 227 and 228 and, in conjunction with OR circuits 231 and 238 and the inverter 237, generate signals in accordance with the table shown in FIGURE 3*b*. Triggers 227 and 228 are initially set to the one state and triggers 234 and 235 are initialy set to the zero state. If the trigger 227 has been reset to the zero state (by a DNR signal) before an error occurs (assuming that the counter 226 does not contain the decimal number three) it is too late to repeat the correct instruction and the AND circuit 242 emits a signal on the interrupt line C1. Since an interrupt of the current program is desired, the OR 238 also enables the line INT. If the trigger 227 is still set to one state at the time that the error signal occurs (indicating that the current instruction may be repeated), a signal will be applied to the reset CC line by either AND circuit 229 or OR circuit 231. If a signal has occurred at input E10 (indicating that the instruction counter 4 has been stepped), the AND circuit 229 is enabled to place signals on line reset CC and also on line IC—1. On the other hand, if the signal E10 has not occurred at the time of the error, AND circuit 230 is enabled to place a signal only on line reset CC. If the counter 226 reaches the decimal value three, there will be an output from AND circuit 232 placing a signal on line C2 and, since an interrupt is desired, on line INT.

*Description of operation*.—Several programs of instructions are stored in the memory 1. A normal main program is contained in locations 1 through 20, one special interrupt program used in the event of a solid malfunction (indicated by a signal on repetition control 19 line C2) is placed in locations 25 through 50, and another special interrupt program, in locations 51 through 71, controls repetition of a main program section in the event of a signal on line C1 from repetition control 19. The particular instructions comprising the programs are irrevelant and will be identified only when helpful to an understanding of the operation of the invention.

Figure 1E:
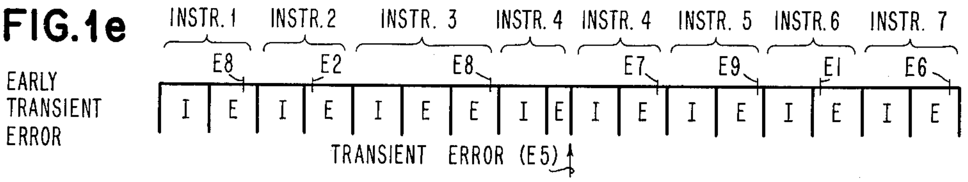

*Description of operation—early transient error*.—Referring to FIGURE 1*e*, operation of the invention will be explained for the case when a transient malfunction causes an error signal to occur prior to the no-return point of an instruction. Prior to the first instruction cycle, in FIGURE 2*a*, the oscillator 124 supplies a pulse to the single shot 123 enabling AND circuits 91 through 102. Since initially only the trigger 82 is assumed to be set to the one state, there will be an A0 output from the clock 10. The output of the AND circiut 102 is also passed through the delay line 122 to set the trigger 81 to the one state and to reset the trigger 82 to the zero state. In FIGURE 2*b*, the signal on the line A0 is applied to AND circuits 182 and 185. Initially it is assumed that the system is not in XI time (that is, there are no interrupt conditions) and that an EOP was signalled by the previous instruction. As a result, the output of AND circuit 185 causes the trigger 183 to be set to the one state resulting in a signal I0. In FIGURES 2*a* and 2*b*, subsequent signals from the oscillator 124 will cause successive signals A0 through A11 to emerge from the clock 10 and enter the cycle timer 11 which they leave on lines I0 through I11.

During the first instruction cycle, at I0 time, the FIGURE 3*a* triggers 227 and 228 are set to the one state. At I2 time the contents (the address of instruction 1) of the instruction counter 4 are transferred to the address register 3. At I4 time the instruction register 6 is reset to all zeros. At I9 time the instruction 1 is transferred from the location in memory 1 designated by the address register 3 into the memory register 2. At I10 time the instruction 1 is transferred from the memory register 2 into the instruction register 6. At I11 time, the contents of the memory register 2 are re-entered into the memory 1 at the location indicated by the address register 3. Also at I11 time the controls 22 generate a signal on the GOE line. In FIGURE 2*b*, the signal on the GOE line sets the trigger 167 to the one state supplying inputs to AND circuits 164 and 184. Since there is a signal on the line A11 at this time, the trigger 183 is set to the zero state. The next signal on the A0 line from clock 10 is applied to the AND circuit 164 causing the trigger 163 to be set to the one state. This results in output on the E0 line from the cycle timer 11. Subsequent pulses A0 through A11 from the oscillator 124 of FIGURE 2*a* cause successive outputs E0 through E11 from the cycle timer 11 of FIGURE 2*b*.

The operation portion of instruction 1 has in the interim been transferred from the instruction register 6 to the operation decoder 9 causing signals to appear on selected command lines in accordance with the designated operation code. The address portion of instruction 1 has been transferred from the address portion of the instruction register 6 to the address register 3. At E8 time, the controls 22 generate one of the gate operating signals which is monitored by the OR circuit 20, bringing up the DNR line. As a result, the trigger 227 in FIGURE 3*a* is reset to the zero state. At E9 time, the contents of memory 1 at the location, now specified by the address register 3 in accordance with instrutcion 1, are transferred to the memory register 2. The data in the memory register 2 is then utilized in some manner indicated by the operation code portion of the instruction 1. It is assumed that this particular instruction does not use the arithmetic units (the adder 5, the accumulator register 7 and the M/Q register 8) to process the data in memory register 2. At E10 time, the instruction counter 4 is incremented by one to indicate the location of instruction 2, and the trigger 228 in FIGURE 3*a* is reset to the zero state. At E11 time, the contents of the memory register 2 are re-entered into the memory 1 at the location specified by the address register 3. Also at E11 time, the controls 22 generate a signal on the EOP line which is applied, in FIGURE 2*b*, to AND circuitis 165 and 185, via OR circuit 193. Since there is at this time a signal on the A11 line, there is an output from the AND circuit 165 to reset the trigger 163 to the zero state. The next pulse, which is an A0 signal, is applied to the AND circuit 185 to set the trigger 183 to the one state, initiating I-time pulse I0 through I11, as previously described.

During the second instruction cycle, at I0 time, the triggers 227 and 228 in FIGURE 3*a* are set to the one state and operations similar to those just described for the first instruction cycle are repeated. In this case, however, the gate line from the controls 22 monitored by the OR circuit 20 causes a DNR signal at E2 time.

The third instruction cycle is performed in much the same manner as the previous instruction cycles with the exception that upon the occurrence of E11 time there is no coincident occurrence of a signal on the EOP line from the controls 22. As a result, in FIGURE 2*b*, trigger 163 remains set to the one state causing a repetition of signals on the lines E0 through E11. During this second occurrence of E1 time, the contents of memory register 2 may be placed into either the adder 5 or M/Q register 8. At E4 time, the contents of the adder 5, as changed, are placed into the accumulator register 7. And at time E8, the contents of either the accumulator register 7 or the M/Q register 8, depending upon which one was used, are transferred to the memory 1. Also at time E8, the FIGURE 3*a* trigger 227 is reset to the zero state. At E11 time, there is an EOP signal from controls 22 causing the trigger 163 in FIGURE 2*b* to be set to the zero state. Therefore, the next A0 signal will cause the trigger 183 to initiate a sequence of I0 through I11 signals.

Instruction 4 is executed in the manner of the previous instructions. An error occurs at time E6, whereas a DNR signal is not scheduled to be emitted by the OR circuit 20 until E7 time of instruction 4. Assuming, for the purposes of this example, that the error results due to the occurrence of condition C36 input to the indicator register 14, there will be an output from OR circuit 21 applied to the error input of repetition control 19. The interrupt IRPT signal from the interrupt indicator is blocked from entering the interrupt timer 12 at this time because only one input to AND circuit 23 is enabled. In FIGURE 3*a*, the error signal is applied to the repetition control 19 at a time when the triggers 227 and 228 are both set to the one state and at a time that the error counter 226 contains the decimal value zero. The application of the error signal to the error counter 226 does not have any effect due to the absence of an I0 signal at this time. The application of the error signal to AND circuit 230 occurs in conjunction with signals from the trigger 228 and the trigger 227 which are both set to the one state. The error counter 226 indicates via the inverter 237, that the current instruction has not been repeated three times. Therefore, there will be an output only from the AND circuit 230 which is applied to the line reset CC via OR circuit 231. The reset CC line goes to the clock 10 of FIGURE 2*a* where it resets all triggers 71 through 81 to the zero state and sets trigger 82 to the one state. As a result, there will be an A0 output from the clock 10 applied to the cycle timer 11. The reset CC line also goes to the cycle timer 11 where it enters OR circuits 166, 190 and 191 causing the triggers 163 and 167 to be reset to the zero state and the trigger 183 to be set to the one state. Therefore there is an output from the cycle timer 11 on line I0. The effect of re-emitting the signal is to cause instruction 4 to be repeated completely from the start. The I0 signal is further applied to the repetition control 19 to set the triggers 227 and 228 to their initial one states and also, if the error signal is still present, to enable AND circuit 233 to complement trigger 234 to the one state. Since the occurrence of a transient error has been assumed, the error signal is no longer present at the repetition control 19 input so that the error counter 226 is not advanced. The instruction 4 will be successfully executed. At E11 time, an EOP signal is supplied by the controls 22 to reset the error counter 226 in FIGURE 3*a* by resetting the triggers 234 and 235 to the zero state and to initiate the fifth instruction cycle. Instruction 5, and subsequent instructions, are executed as previously explained.

Figure 1F:
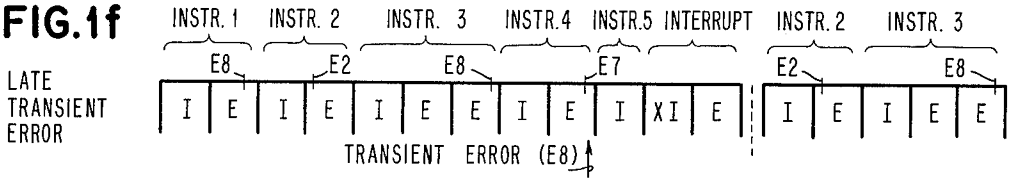

*Description of operation—late transient error.*—The execution of instructions 1, 2, 3 and 4 proceed as previously described with reference to FIGURE 1*e*. However, in this example, illustrated by FIGURE 1*f*, a transient error occurs during the fourth instruction cycle at time E8 subsequent to the occurrence of a DNR signal at time E7.

During the fourth instruction cycle at time E7, a DNR signal is applied to the repetition control 19 of FIGURE 3*a* to reset the trigger 227 to the zero state. At time E8, an error signal occurs which is also applied to the repetition control. Since the trigger 227 is set to the zero state and since the error counter 226 does not contain the decimal number three and since the trigger 228 is set to the one state, there will be an output from the AND circuit 242, placing a signal on the line C1 and on the line INT. The signal INT is applied to AND circuit 23 which enables the gate to pass signal IRPT to the interrupt timer 12. In FIGURE 2*c* the signal IRPT is applied to AND circuit 217. The execution of instruction 4 is completed, at which time an EOP signal is generated by the controls 22 to cause an output from AND circuit 217 in FIGURE 2*c* which sets the trigger 216 to the one state. A normal fifth instruction cycle proceeds until I11 time when there is an output from the AND circuit 215 which sets the trigger 213 to the one state. Signals A0 through A11 from the clock 10 therefore emerges from the interrupt timer 12 as signals XI0 through XI11. The setting of the trigger 213 to the one state removes the $\overline{XI}$ signal in FIGURE 2*b*, and causes the AND circuit 164 to make the trigger 163 remain in the zero state even though the trigger 183 was reset to the zero state during the previous A11 time. Note that the controls 22 have, at the previous I11 time, supplied a GOE signal which is stored in the trigger 167, but which is not used until later.

Previous to the recognition of the interrupt condition C1 by the interrupt timer 12, the leftmost-one counter 16 has supplied an indication identifying condition C1 to the interrupt adder 17. At XI2 time the combination (specifying location 51 in memory 1) of this indication and the contents of the base address register 18 are transferred to the address register 3. At XI4 time the instruction register 6 is reset. At XI9 time the contents of the memory 1 at the location 51 specified in the address register 3 are transferred into the memory register 2. At XI10 time the contents of the memory register 2 are transferred to the instruction register 6. At XI11 time the contents of the memory register 2 are returned to the memory 1. Subsequent interrupt operations continue, in the manner described in the Brooks patent referenced above, eventually causing the program to be re-executed starting with instruction 2. Since the error is defined, in this example, as transient the re-execution of a segment of the program successfully compensates for the malfunction.

Figure 1G:
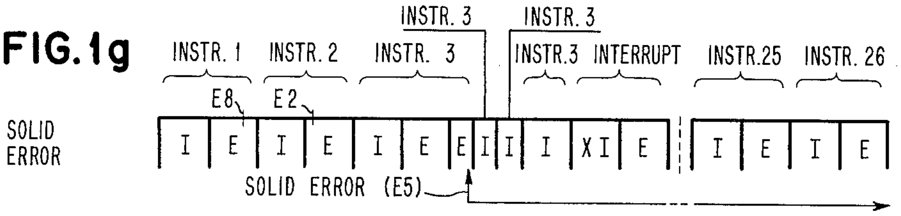

*Description of operation—solid error.*—Referring to FIGURE 1*g*, the occurrence at time E5 of a solid error prior to the occurrence (at time E8) of a DNR signal during instruction 3 will be described.

Instructions 1 and 2 are executed in the normal manner. During the third instruction cycle the first occurrence of E10 time causes the trigger 228 in FIGURE 3*a* to be reset to the zero state. Coincident with the second occurrence of E5 time, an error is signalled as a result of a solid malfunction indicated by a signal C3 to the indicator register 13 which is sent as an error signal from the OR circuit 21 to the repetition control 19. Since trigger 228 in FIGURE 3*a* is set to the zero state, and since the error counter 226 does not contain the decimal value three, there will be an output from AND circuit 229 causing signals to appear on lines IC—1 and reset CC. A signal on line IC—1 is supplied to the instruction counter 4 decrementing it so that it again designates instruction 3 (it having previously been incremented to indicate instruction 4) and the signal on the reset CC line acting, as previously described with reference to FIGURE 1*e*, to initiate a repetition of instruction 3 starting at I0 time. In FIGURE 3*a*, at I0 time the triggers 227 and 228 are set to the one state and since the error is still present, the trigger 234 is complemented to the one state. Since the error is still present at this time and the triggers 227 and 228 are set to the one state there will be an output from AND circuit 230 causing a signal on the line reset CC. The signal on the line reset CC causes a second repetition of the instruction 3 to again begin at I0 time. The second occurrence of I0 time in conjunction with the continuance of the error signal causes the error counter 226 trigger 234 to be complemented to the one state. Since the error is still present at this time and triggers 227 and 228 are set to the one state there will be an output from AND circuit 230 causing a signal on the line reset CC. The signal on the line reset CC causes a second repetition of the instruction 3 to again begin at I0 time. The second occurrence of I0 in conjunction with the continuance of the error signal causes the error counter 226 trigger 234 to be complemented to the zero state resulting in a polarity change which sets the trigger 235 to the one state. The second occurrence of I0 time for instruction 3 also results in an output from AND circuit 230 causing a signal to appear on reset CC line signalling a third repetition of instruction 3. The third appearance of I0 time causes the trigger 234 in the error counter 226 to be complemented to the one state so that the AND circuit 236 is enabled. Thus the error counter 226 indicates to the AND circuit 232 that there have been three successive repetitions of the same instruction and, via the inverter 237, prevents further incrementing of the error counter 226. Therefore, AND circuit 232 will supply an output on the C2 line and, via the OR circuit 238, a signal on the INT line.

The signal on the line C2 from the repetition control 19 is supplied to the indicator register 13 and the signal on the line INT is supplied to the AND circuit 23 to permit an IRPT signal to notify the interrupt timer 12 that an interrupt is desired. The C2 signal is applied to the cycle timer 11 in FIGURE 2*b* via an OR circuit 193 so that an EOP signal is imitated for the purpose of immediately initiating an interrupt (which normally awaits the EOP signal generated at the end of each instruction causing a long delay if the current instruction has several E-times). The C2 signal is applied to AND circuits 165 and 185 in FIGURE 2*b* to reset the trigger 163 to the zero state at A11 time and to set the trigger 183 to the one state at the next A0 time. The output of OR circuit 193 is also applied to the interrupt timer 12 of FIGURE 2*c* to cause an output in conjunction with an IRPT signal from AND circuit 217 setting trigger 216 to the one state. As described, the next instruction (which is instruction 3 since the instruction counter 4 was not incremented) has commenced in the normal manner until a special XI time is entered at time I11. The function of this interrupt is to enter a special program comprising instructions starting with instructions 25 and 26 which will diagnose the cause of the solid malfunction and take corrective action.

There has been described apparatus for permitting the recognition of a point in each instruction after which the instruction may not be repeated. If this point has been passed at the time that an error occurs, corrective action is taken to attempt to repeat as much of the program, including the instruction, as is necessary to compensate for the error. If the error occurs before this point is reached then the instruction may be repeated immediately. If during the repetition of an instruction no error occurs, the error is considered to have been the result of a transient malfunction in the system. If however the error persists during repetition of the instruction, the error is classified as being the result of a solid malfunction and corrective action is taken.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In an electronic data processing system controlled by sequences of instructions each comprising a plurality of simultaneously utilized bits, including:

execution means for executing during a period of time a current instruction from a normal sequence of successive instructions and, in response to signals, repeating or blocking the execution of such instruction;

repeat-point signal means connected to said execution means, operable during the execution of an instruction to supply a repeat-point signal at a point, within said period of time, preselected for each instruction;

indicating means for generating an error signal upon the occurrence of an error in said system during said period of time;

first control means, connected to said execution means, said repeat-point signal means automatically and said indicating means, operable upon the occurrence of an error signal generated by said indicating means prior to a repeat-point signal supplied by said repeat-point signal means, during said period of time, to initiate a number of signals effective to cause said execution means to immediately repeat said current instruction;

second control means, connected to said execution means, said repeat-point signal means and said indicating means automatically operable upon the occurrence of an error signal generated by said indicating means after the occurrence of a repeat-point signal supplied by said repeat-point signal means, during said period of time, to initiate a number of signals effective to permit said execution means to complete execution of said current instruction and to block execution of the next successive instruction; and third control means, connected to said execution means, said repeat-point signal means and said indicating means automatically operable after a predetermined number of repetitions of said current instruction to initiate a number of signals effective to block execution of the current instruction.

2. The system of claim 1 further including:

interrupt means connected to said execution means and responsive to preselected conditions for automatically initiating the execution of instructions outside said sequence of instructions in accordance with such conditions; and means connecting said interrupt means with said second and said third control means automatically operable upon the blocking of an instruction by a number of signals from one of said second and third control means to supply a condition to cause said interrupt means to initiate the execution of instructions outside said normal sequence.

3. Apparatus for automatically differentiating short-lived errors from long-lived errors, both manifested as signals in an electronic computer controlled by the execution of one current instruction at a time, selected by indications from an instruction sequence, including:

first means having a first output, operative during the execution of each current instruction in said computer in one sequence to generate a first signal at said first output;

second means having a second output and, connected to said first means, operative in response to errors manifested as signals in said computer and to said first signal from said first means first output to emit a second signal at said second output when an error signal and said first signal occur in one order, and to emit a third signal at said second output when an error signal and said first signal occur in another order; and third means, connected to said second means, operable in response to said second signal from said second means second output to supply indications to cause repetition of said current instruction in said computer and operable in response to said third signal from said second means second output to supply indications to initiate the execution of another instruction in said computer.

4. The apparatus of claim 3, further including:

fourth means, connected to said third means, operative, in response to said indications, after a specified number of repetitions of the current instruction to supply additional indications to cause the execution of another instruction in said computer.

5. In program-controlled apparatus wherein successive instructions each comprising a plurality of substantially simultaneously utilized bits, are each separately executed in a series of steps, including:

indicating means, having an output, for indicating as a signal at such output, during a step, preselected for each instruction, a critical point in the execution of each instruction;

monitoring means, having an output for monitoring conditions in said apparatus and manifesting such conditions as signals at such output;

control means connected to said indicating means output and said monitoring means output for causing immediate repetition of and automatically responsive to said signals therefrom, said instruction if a signal at said monitoring means output occurs in said apparatus prior to a signal at said indicating means output, and for causing completion of said instruction if a signal at said monitoring means output occurs subsequent to the signals at said indicating means output.

6. In the apparatus of claim 5, further means indluding:

correction means automatically operable by an input;

means connected to said correction means and said control means, for supplying an input giving effect to said correction means when said signal at said monitoring means output occurs subsequent to the signal at said indicating means output.

7. In the apparatus of claim 5, further means including:

means connected to said control means for determining the number of repetitions of an instruction and providing number-indicative signals;

correction means;

means operable by an input, connected to said determining means and said correction means, for supplying an input giving effect to said correction means in response to number-indicative signal from said determining means indicative of a number of repetitions of an instruction exceeding a specified number.

8. In combination:

a source for supplying signals manifesting a plurality of programs of instructions, including a first program and a number of second programs;

executing means connected to said source, and operative in response to said signals, for executing in steps, including a specified step which may be different for each instruction, each instruction supplied by said source;

indicating means connected to said first means for indicating as error signals the occurrence of errors during the execution of an instruction by such executing means;

computing means connected to said executing and indicating means for comparing said specified steps with the occurrence of selected error signals and supplying first, second, and third sets of result signals indicative of the results of such comparison; and means connected to said comparing means, said executing means, and said source means automatically operable in a plurality of cases in accordance with the result signals from said comparing means to cause the executing means to repeat the supplied instruction in response to said first set of result signals, repeat a part of said first program in response to said second set of result signals and to cause the source of supply one of said second programs to said execution means in response to said third set of result signals.

9. In a system for processing data in accordance with programs of instruction wherein each instruction in turn results in the generation of a plurality of sequenced signals during a given cycle;

detecting means, having an error output, for detecting errors in said system during said cycle and generating error signals at said error output;

indicating means, having a control output, as a control signal *qt* such control output, for indicating the generation of a specified signal as a result of an introduction during said cycle indicative of a point in such instruction prior to which repetition of such instruction may be caused; and repetition means, connected to said detecting means error output and to said indicating means control output, for automatically causing repetition of an instruction when an error signal is generated at said detecting means error output before generation of the control signal at said indicating means control output.

10. The system of claim 9, further including:

means, correction connected to said repetition means, and responsive thereto, for identifying the nature of errors causing error signals and taking corrective action if an error signal occurs at said detecting means error output at any time during the cycle of a repeated instruction.

11. In an electronic data processing system controlled by sequences of instructions, each instruction comprising a plurality of simultaneously utilized information positions, including:

a memory, having addressable locations for storing a number of instruction sequences including a normal sequence;

memory accessing means, connected to said memory, operable to gain access to instruction locations and make available accessed instructions from addressed locations, in sequence, one at a time;

repeat-point signal means, operable during the execution of an instruction accessed from member to supply a repeat-point signal at a point, within said period of time, preselected for each instruction in accordance with information positions of the instruction being executed;

monitoring means, for monitoring specified conditions in said system;

indicating means, connected to said monitoring means, for generating an error signal upon the occurrence of a monitored condition in said system during the execution of an instruction;

first control means, connected to said repeat-point signal means and said indicating means, operable without human intervention upon the occurrence during execution of a current instruction of an error signal generated by said indicating means, prior to a repeat-point signal supplied by said repeat-point signal means to cause a first output signal combination to occur;

second control means, connected to said repeat-point signal means and said indicating means operable without human intervention upon the occurrence during execution of a current instruction of an error signal generated by said indicating means, after the occurrence of a repeat-point signal supplied by said repeat-point signal means, to cause a second output signal combination to occur;

execution means, connected to said first and second control means, said memory and to said memory accessing means for executing during a period of time each instruction in memory, from said normal sequence of instructions in memory, to which access is gained, and responsive to said first output signal combination from said first control means to immediately repeat execution of said current instruction being executed, and responsive to said second output combination from said second control means to permit said execution means to complete execution of said current instruction being executed;

blocking means, included within said second means, operable upon the completion of said current instruction to supply a signal to said execution means to block execution of the next instruction in the normal sequence;

counting means, connected to said first control means and responsive to signal supplied to said first control means, for recording as states each successive repetition of execution of said current instruction; and third control means, connected to said execution means and said counting means, operable in response to the states recorded in said counting means after a predetermined number of successive repetitions of said current instruction to supply a signal to said execution means to block execution of said current instruction.

12. The system of claim 11, further including:

interrupt means connected to said memory accessing means and said execution means operable in response to stimuli to initiate the execution of instructions outside said sequence of instructions; and means, connecting said interrupt means with said second and third control means, operable upon the blocking of execution of an instruction in accordance with a signal from one of said second and third control means to supply stimuli to make said interrupt means operable to initiate the execution of instructions outside said normal sequence.

References Cited by the Examiner

UNITED STATES PATENTS

| | | | |
|---|---|---|---|
| 3,037,698 | 6/1962 | Saxenmeyer | 235—153 |
| 3,077,579 | 2/1963 | Green et al. | 235—153 |

ROBERT C. BAILEY, *Primary Examiner.*

MALCOLM A. MORRISON, *Examiner.*

S. DAVID, M. LISS, *Assistant Examiners.*